US012503336B2

(12) United States Patent
Ackermann et al.

(10) Patent No.: US 12,503,336 B2
(45) Date of Patent: Dec. 23, 2025

(54) OPERATING METHOD FOR AN ELEVATOR OPERATING DEVICE WITH A TOUCH-SENSITIVE SCREEN SYSTEM

(71) Applicant: INVENTIO AG, Hergiswil (CH)

(72) Inventors: Marcel Ackermann, Kirchberg (CH); Nicolas Häfliger, Oberägeri (CH)

(73) Assignee: INVENTIO AG, Hergiswil (CH)

(*) Notice: Subject to any disclaimer, the term of this patent is extended or adjusted under 35 U.S.C. 154(b) by 971 days.

(21) Appl. No.: 17/637,975

(22) PCT Filed: Aug. 21, 2020

(86) PCT No.: PCT/EP2020/073520
§ 371 (c)(1),
(2) Date: Feb. 24, 2022

(87) PCT Pub. No.: WO2021/037736
PCT Pub. Date: Mar. 4, 2021

(65) Prior Publication Data

US 2022/0274803 A1 Sep. 1, 2022

(30) Foreign Application Priority Data

Aug. 28, 2019 (EP) .................................... 19194150

(51) Int. Cl.
*B66B 1/52* (2006.01)
*B66B 1/34* (2006.01)
(Continued)

(52) U.S. Cl.
CPC .............. *B66B 1/468* (2013.01); *B66B 3/002* (2013.01); *B66B 1/3461* (2013.01);
(Continued)

(58) Field of Classification Search
CPC ....... B66B 1/468; B66B 3/002; B66B 1/3461; B66B 2201/103; B66B 2201/4615; B66B 2201/463
See application file for complete search history.

(56) References Cited

U.S. PATENT DOCUMENTS 4,678,062 A 7/1987 Sumka
5,311,175 A 5/1994 Waldman
(Continued)

FOREIGN PATENT DOCUMENTS

CN 102874662 A 1/2013
CN 105270944 A 1/2016
(Continued)

OTHER PUBLICATIONS

International Search Report for International Application No. PCT/EP2020/073520 dated Nov. 11, 2020.

*Primary Examiner* — Eduardo Colon Santana
(74) *Attorney, Agent, or Firm* — Knobbe, Martens, Olson & Bear, LLP

(57) ABSTRACT

An elevator operating device for a floor comprises a touch-sensitive screen. Call symbols are displayed on a user interface, one of which has to be touched in order to input a character stored for this call symbol. In order to enter a two-digit destination floor, the passenger leaves their finger on the touch surface after inputting a first character, whereby the elevator operating device recognizes that the passenger has limited vision. The elevator operating device registers a second character if it detects a confirmation action for the second character without recognizing that the finger has been lifted from the touch surface. As long as the finger is touching the touch surface, no destination call is generated; the destination call is only generated when the passenger lifts their finger, thus indicating that the input has been completed.

15 Claims, 3 Drawing Sheets

(51) Int. Cl.
*B66B 1/46* (2006.01)
*B66B 3/00* (2006.01)

(52) U.S. Cl.
CPC . *B66B 2201/103* (2013.01); *B66B 2201/4615* (2013.01); *B66B 2201/463* (2013.01)

(56) References Cited

U.S. PATENT DOCUMENTS

| | | | | |
|---|---|---|---|---|
| 6,502,668 | B1 * | 1/2003 | Chida | H01H 13/70 187/391 |
| 7,404,471 | B2 * | 7/2008 | Felder | B66B 1/463 187/395 |
| 9,718,641 | B2 | 8/2017 | Finschi | |
| 10,294,069 | B2 * | 5/2019 | King | B66B 9/003 |
| 12,297,074 | B2 * | 5/2025 | Kinnari | B66B 5/0025 |
| 2004/0000453 | A1 | 1/2004 | Eccleston | |
| 2006/0225964 | A1 | 10/2006 | Takeuchi | |
| 2008/0024459 | A1 | 1/2008 | Poupyrev et al. | |
| 2009/0294221 | A1 * | 12/2009 | Bahjat | B66B 1/468 187/396 |
| 2011/0080369 | A1 | 4/2011 | Chang et al. | |
| 2012/0024638 | A1 * | 2/2012 | Poutiainen | B66B 1/463 187/395 |
| 2017/0073185 | A1 * | 3/2017 | Haipus | B33Y 10/00 |
| 2018/0127234 | A1 * | 5/2018 | Lofberg | B66B 3/002 |
| 2020/0048035 | A1 * | 2/2020 | Dayasagar | B66B 1/468 |
| 2022/0127111 | A1 * | 4/2022 | Ackermann | B66B 3/006 |
| 2022/0242695 | A1 * | 8/2022 | Ackermann | B66B 1/463 |

FOREIGN PATENT DOCUMENTS

| | | | | | |
|---|---|---|---|---|---|
| CN | 103974888 | B | * | 12/2017 | B66B 1/463 |
| CN | 109002819 | A | | 12/2018 | |
| CN | 110121474 | A | | 8/2019 | |
| EP | 0699617 | B1 | | 5/2000 | |
| EP | 1 633 669 | B1 | | 3/2006 | |
| EP | 2331443 | B1 | | 5/2013 | |
| EP | 3297942 | A1 | | 3/2018 | |
| JP | 2004203616 | A | | 7/2004 | |
| JP | 2011037570 | A | | 2/2011 | |
| JP | 2013056732 | A | | 3/2013 | |
| JP | 2016216166 | A | | 12/2016 | |
| KR | 101154459 | B1 | * | 6/2012 | |
| KR | 20170089608 | A | * | 8/2017 | B66B 1/46 |
| KR | 20180077543 | A | | 7/2018 | |
| WO | WO 2004/103879 | A1 | | 12/2004 | |
| WO | WO 2009144259 | A1 | | 12/2009 | |
| WO | WO 2015169351 | A1 | | 11/2015 | |
| WO | WO 2016014313 | A1 | | 1/2016 | |
| WO | WO 2016090392 | A1 | | 6/2016 | |
| WO | WO 2016/184519 | A1 | | 11/2016 | |
| WO | WO 2017079683 | A1 | | 5/2017 | |
| WO | WO 2018141352 | A1 | | 8/2018 | |

* cited by examiner

OPERATING METHOD FOR AN ELEVATOR OPERATING DEVICE WITH A TOUCH-SENSITIVE SCREEN SYSTEM

TECHNICAL FIELD

The technology described herein relates in general to an elevator installation. Embodiments of the technology relate in particular to an elevator installation in which elevator operating devices having touch-sensitive screen systems are arranged on floors, an elevator operating device for such an elevator installation and a method for controlling such an elevator operating device.

SUMMARY

Known elevator installations can be equipped with an up/down direction controller or a destination call controller, for example. Depending on the control technology that is used in an elevator installation, different types of elevator operating devices are used. An elevator operating device for an elevator installation, which device is arranged on a floor and has an up/down direction controller, has, for example, a button for an upward direction of travel and a button for a downward direction of travel. By pressing one of these buttons, a passenger on the floor can input the desired direction of travel. In such an elevator installation, an elevator car has a car terminal by means of which the passenger inputs the desired destination floor, for example by pressing a button assigned to the destination floor. An elevator operating device for an elevator installation, which device is arranged on a floor and has a destination call controller, has, for example, a plurality of push buttons or fields on a touch-sensitive screen. A push button or a field can be assigned to a destination floor. By pressing or touching one of these buttons, the passenger on the floor can input the desired direction of travel. A call input in the elevator car is then usually no longer possible.

The input of the direction of travel or destination floor is usually confirmed to the passenger optically and/or acoustically. For this purpose, the elevator operating device has an illumination device and, for example, a buzzer, e.g., an electrically actuated acoustic signal generator that can generate an audible buzzing or beeping sound. The illumination device has, for example, for each button, a light source that lights up the pressed button or highlights it using a different light effect. An elevator operating device described in EP 1 633 669 B1 has these functions, for example. In addition to this, the elevator operating device described in EP 1 633 669 B1 confirms that a button has been pressed by means of (haptic) feedback which can be perceived by the sense of touch and which, for example, can also be perceived by passengers with impaired vision.

Although in known elevator installations such elevator operating devices allow an elevator call to be input in different ways and confirm the call input, including by means of haptic feedback, there may be additional requirements for the elevator operating devices, depending on the building. Particularly in tall buildings with a correspondingly high number of floors, there may be requirements with regard to the design (e.g., size and shape), user-friendliness (in particular taking into consideration passengers with physical disabilities, e.g., visually impaired passengers), and/or ease of maintenance. There is therefore a need for a technology that meets one or more of these requirements.

One aspect of the technology described here relates to a method for operating elevator operating devices in an elevator installation having an elevator car and an elevator controller. The elevator operating devices are communicatively connected to the elevator controller and are arranged on floors for the input of a destination call. An elevator operating device has a touch-sensitive screen system which is equipped with a substantially smooth touch surface and is configured to display a graphic user interface having a number of call symbols and to respond with haptically perceptible feedback when a passenger touches the touch surface. In the method, contact with the touch surface of an elevator operating device made by the passenger when inputting a destination call is detected. The contact comprises the passenger touching a first call symbol displayed on the graphic user interface, the first call symbol being assigned to a first character. A voice message indicating the first character and the haptically perceptible feedback are generated in the method. The first character is registered as the first input assigned to the destination call input of the passenger, the first character being registered in response to a confirmation action by the passenger while touching. In the method, at least one further character is registered as a further input assigned to the destination call input of the passenger, the at least one further character being registered in response to a further confirmation action by the passenger while touching and the at least one further character being stored for the first call symbol or another call symbol. In the method, the destination call is generated when the touch is interrupted, the destination call indicating a destination floor defined by the registered characters.

Another aspect of the technology relates to an elevator operating device for inputting a destination call in such an elevator installation. The elevator operating device has a communication device which is configured to communicate with an elevator controller of the elevator installation, a central control and processing device which is communicatively connected to the communication device, an audio device which is communicatively connected to the central control and processing device and configured to generate a voice message, and a touch-sensitive screen system which is equipped with a substantially smooth touch surface and communicatively connected to the central control and processing device. The screen system is configured to display a graphic user interface having a number of call symbols and to respond with haptically perceptible feedback to a touch of the touch surface by a passenger. The screen system is also configured to detect contact with the touch surface made by the passenger when inputting a destination call, contact comprising the passenger touching a first call symbol displayed on the graphic user interface, the first call symbol being assigned to a first character. The screen system is also configured to generate haptically perceptible feedback. The audio device is configured to generate a voice message which indicates the first character of the touched first call symbol. The central control and processing device is configured to register the first character as the first input assigned to the destination call input of the passenger, the first character being registered in response to a confirmation action by the passenger during touching, and to register at least one further character as the further input assigned to the destination call input of the passenger. The at least one further character is registered in response to a further confirmation action by the passenger during touching, the at least one further character being stored for the first call symbol or a further call symbol. The central control and processing device is also configured to generate a destination call when the touch is interrupted, which destination call specifies a destination floor defined by the registered characters, and to send said call to the elevator controller in order to be registered there.

Another aspect of the technology relates to an elevator installation that has an elevator operating device according to the technology described here. Such an elevator operating device can be provided on each floor in a building. An additional aspect of the technology relates to a method for operating such an elevator installation.

The technology described herein provides an elevator installation in which an elevator operating device arranged on a floor, despite a touch-sensitive screen system having a substantially smooth touch surface, can be operated comfortably and reliably by passengers with and without physical disabilities. A number of call symbols are visibly displayed on the user interface, one of which must be touched in order to input the character stored for this call symbol. Since passengers with impaired vision cannot identify the displayed call symbol, or can only identify it very poorly, and cannot feel said symbol on the smooth surface either, the elevator operating device supports the call input according to the technology described here.

In an elevator installation, it may be necessary to touch several call symbols in order to input the destination floor. For example, a two-digit destination floor (e.g., 10, 23, 55, or −1, −2, etc.) may require the passenger to touch the two call symbols belonging to the destination floor one after the other relatively quickly. This can be challenging for a passenger with a physical disability, especially for those who are blind. The technology described here supports the passenger in particular when inputting a multi-digit destination floor. In the embodiments described below, a destination floor has two digits; it is correspondingly necessary to input two characters, for example the first digit from left to right and then the second digit of the destination floor. However, the technology described here is not restricted to use in connection with two-digit destination floors.

According to the technology described here, in a first step, the passenger touches the desired call symbol with a finger and confirms this in order to input the first character or the first digit of the destination floor. The passenger is supported by the voice message generated by the audio device and the haptically perceptible feedback. After this first input, the passenger leaves their finger on the touch surface; as a result, the elevator operating device recognizes that it is a passenger with restricted vision. Without lifting their finger from the touch surface, the passenger then searches for the call symbol for the second character or the second digit of the destination floor in a second step. The passenger is also supported by the voice message generated by the audio device and the haptically perceptible feedback. If the finger touches the desired call symbol, the passenger confirms this in order to input the second character or the second digit of the destination floor. If the finger moves over several call symbols in connection with the first step and the second step, an associated voice message and haptically perceptible feedback are generated for each call symbol. As long as the finger is touching the touch surface, no destination call is generated; the destination call is only generated when the passenger lifts their finger, indicating that the input has been completed.

Despite this design, passengers without physical disabilities can also use the elevator operating devices. Such a passenger can recognize every call symbol and touch/press the desired call symbol in order to input the character stored therefor. The passenger then lifts their finger, either to end the input or to make another input. However, the further input must be made within a defined time period in order to be recognized as such. If the second input is only made after the defined time period has elapsed, in one embodiment a destination call may be generated based on the first input. Alternatively, the first input can be discarded and the passenger can be asked to make another input. The elevator operating units according to the technology described here can thus be used by a majority of passengers.

In one embodiment, a call symbol displayed on the user interface depicts a push button or a symbol for a push button. The push button depicted can, for example, be modeled on a known electromechanical push button (e.g., in a round or rectangular shape). The displayed call symbols can be depicted in a uniform shape and size, but it is also possible for one or more of the call symbols to be depicted in such a way that they differ from the other call symbols. A call symbol can also include a colored (single or multi-colored) light effect. A light effect can also be used to confirm input of a character. The examples mentioned show that the technology described herein allows a high degree of flexibility with regard to the depiction of a call symbol. In addition, passengers without physical disabilities can operate the elevator operating device intuitively.

In one embodiment, the screen system is configured to respond with the haptically perceptible feedback when the passenger touches the at least one call symbol and to identify input of a character when the touch reaches a defined pressing force. This ensures that not every touch, e.g., an unintentional or accidental touch, leads to call input; rather, this is only the case if the passenger presses sufficiently hard on the call symbol.

Regarding the voice message, the screen system responds with a voice message to a light touch (e.g., a touch with a low pressing force) in one embodiment. If there is a call symbol at the location where the passenger touches the touch surface, the voice message communicates the information assigned to the call symbol to the passenger. If there is no call symbol or information field at this location, there is no voice message in one embodiment. If the voice message corresponds to the passenger's request (e.g., input of a single-digit floor or a digit of a multi-digit floor), the passenger can press the corresponding location or the corresponding call symbol harder in order to input the character. This also supports passengers with a physical disability in operating the system. In addition, such a two-stage procedure increases the probability that only real inputs are registered.

In one embodiment, the touch-sensitive screen system comprises an actuator which, when actuated by a control voltage, causes a surface of the screen system to vibrate, the vibration being the haptically perceptible feedback. The type and strength of the vibration can be defined flexibly here. The touch-sensitive screen system also includes a force measuring device and a control device. The force measuring device is configured to measure a force with which a passenger presses on the user interface of the screen system, the control device being configured to register the measured force as a triggering force only if the measured force reaches a defined threshold value. As already mentioned, this can reduce input errors caused by unintentional touching, since the passenger has to indicate their travel request by pressing harder.

Using the technology described here, there is flexibility with regard to the type of said confirmation action. In one embodiment, increased pressure by the passenger on the touch surface is defined as a confirmation action. As the pressure increases, the force measured by the force measuring device increases. Registering the first character comprises detecting that a pressure threshold value established for the pressure has been reached, e.g., the character is registered when the triggering force is reached. In another embodiment, tapping the touch surface several times within a defined time period is defined as a confirmation action. The tapping is detected while the touch (which ensued previously and continues) is detected. The tapping is detected at a location that is remote from a location of the touch.

In one embodiment, registering at least one further character comprises detecting a drop in the pressure to a value that is greater than zero and less than the defined pressure threshold value. The pressure drop is recognized immediately after the first character has been registered as the first input; the pressure drop indicates that the touch surface is still being touched.

The continuing touch comprises the first call symbol or a further call symbol being touched, e.g., the passenger leaves their finger on the first call symbol or moves their finger on the touch surface to the further call symbol. When the further call symbol is touched, a voice message indicating the further character and the haptically perceptible feedback are generated. In one embodiment, the further character is then registered when it is detected that the pressure threshold value defined for the pressure has been reached, the character stored for the touched first or further call symbol being registered as an input.

In one embodiment, the information field displays information regarding a specified floor, for example which service provider is located on the floor. The elevator operating device is configured to generate the haptically perceptible feedback and a voice message assigned to the information field when the passenger touches the information field. The voice message can, for example, indicate the name of the service provider and the floor. If the passenger wishes to travel to this floor, they press the information field. If the pressing force is equal to a defined threshold value, the elevator operating device registers a request to travel to the specified floor. The elevator operating terminal can thus be flexibly adapted to building-specific requirements. In addition, passengers can be informed conveniently, in an up-to-date manner, and more extensively, for example regarding planned maintenance of the elevator installation; however, it can also be indicated which service provider (e.g., doctor, dentist, lawyer, etc.) is on a particular floor.

The technology described herein not only achieves an elevator installation and associated elevator operating devices that can be used comfortably and reliably by the majority of passengers, but also allows safety aspects to be taken into account. In one embodiment, an elevator operating device has a reader, communicatively connected to the elevator controller, for credentials of the passenger. The type of credentials can, for example, be adapted to circumstances in the building; for example, said credentials can be selected so as to be in the form of a physical key, a manually input password (e.g., a PIN code), a biometric feature (e.g., fingerprint, iris pattern, facial features, speech/voice characteristics), or an access code captured from a magnetic card, chip card, or RFID card, or from a mobile electronic device (NFC-, Bluetooth- or cellular network-based). For passengers with physical disabilities, for example, a mobile electronic device can send the credentials to the reader wirelessly. If the credentials are valid, the elevator operating device approves the input of an elevator call. This means that only authorized passengers can call an elevator, as a result of which access to the elevator and thus also to the floors can be controlled.

The touch-sensitive screen system used in accordance with the technology described herein comprises a touchscreen. A touchscreen can be produced in different sizes or dimensions depending on the application and requirements. The size of the screen system can thus also be selected according to the requirements in the building such that, for example, a relatively small screen system can be selected if only the call symbol is intended to be displayed in the normal operation mode. If one or more information fields are also intended to be displayed, the size of the screen system can be selected accordingly.

In addition to this flexibility in terms of size, a touchscreen also offers the advantage of having a smooth surface. Dirt can be removed more easily from a smooth surface than, for example, from an arrangement that has one or more buttons having elevations and/or grooves and gaps. This reduces the maintenance outlay.

The technology described herein also allows freedom in terms of design, for example with regard to the shape of an elevator operating device on the passenger side. Their housings can, from the passenger's perspective, be rectangular, for example, it being possible for the touchscreen to be arranged either in parallel with the vertical (wall) or (for better ease of use (viewability)) inclined with respect thereto. In particular in buildings for which a contemporary or modern appearance is desired, the elevator operating devices equipped with touchscreens can help to achieve this goal.

BRIEF DESCRIPTION OF THE DRAWINGS

Various aspects of the improved technology are described in greater detail below with reference to embodiments in conjunction with the drawings. In the drawings, identical elements have identical reference signs. In the drawings.

DETAILED DESCRIPTION

Figure 1:
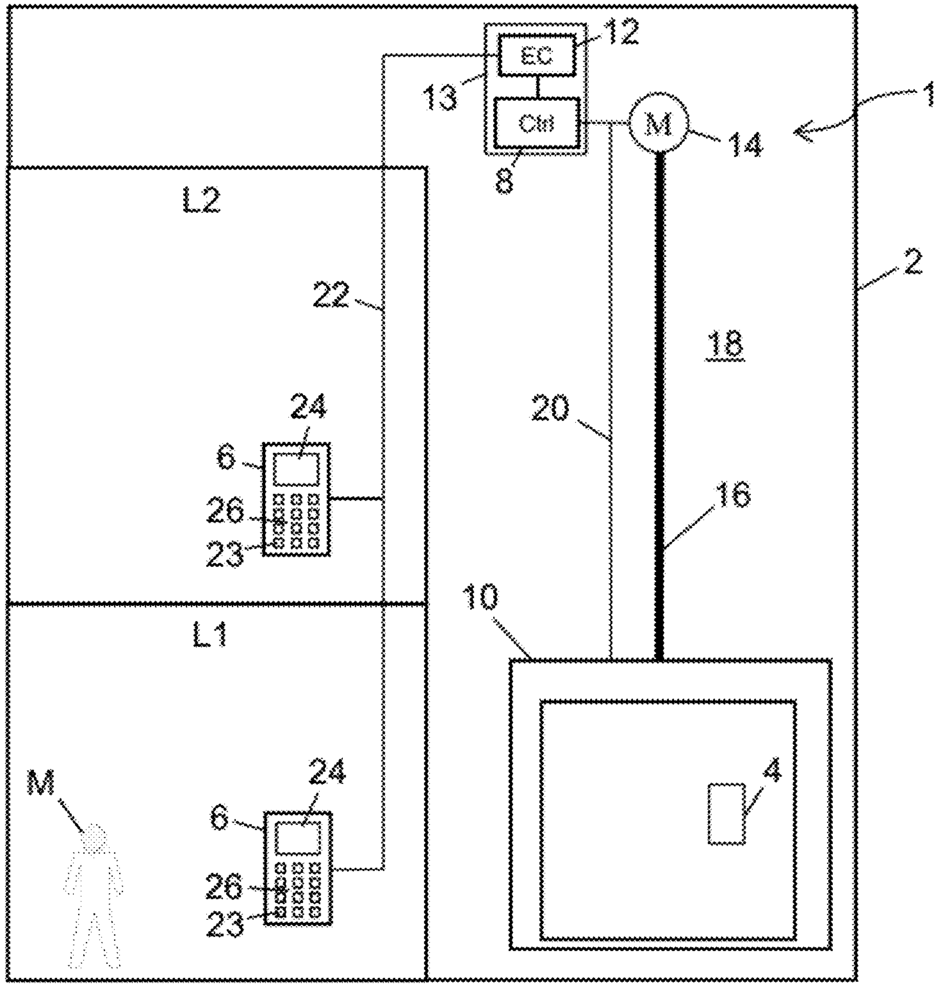
FIG. 1 is a schematic representation of an example of a situation in a building having a plurality of floors and an example of an elevator installation.

FIG. 1 is a schematic view of an example of a situation in a building 2 which has a plurality of floors L1, L2 that are served by an elevator installation 1. The floor L1 can be an entrance hall of the building 2, into which hall the passengers P enter when accessing the building 2 and from which the passengers leave the building 2 again. If a passenger M enters the floor L1, each floor L2 of the building 2 served by the elevator installation 1 can be reached from there, with appropriate access authorization. For the purpose of illustration, of the elevator installation 1, only an elevator controller 13, a drive machine 14, a suspension device or means 16 (e.g., steel cables or flat belts), an elevator car 10 (hereinafter also referred to as car 10), which is suspended on the suspension means 16 and is movable in a shaft 18, and a number of elevator operating devices 6, which are communicatively connected to the elevator controller 13 by means of a communication network 22, are shown in FIG. 1. A person skilled in the art would recognize that the elevator installation 1 can also comprise a plurality of cars 10 in one or more shafts 18 that are controlled by a group controller. Instead of a traction elevator (shown in FIG. 1), the elevator installation 1 can also have one or more hydraulic elevators.

In the embodiment described herein of the elevator installation 1, the passenger M on one of the floors L1, L2 inputs a travel request at an elevator operating device 6 arranged there, as a result of which an elevator call is registered. The floor L1, L2 on which the passenger M is located and from which they would like to be transported to a destination floor is also referred to below as the boarding floor. As explained in more detail elsewhere in this description, the passenger M can touch one or more call symbols 23 on the elevator operating device 6 to input the call, whereupon the registration of the elevator call on the elevator operating device 6 is confirmed to the passenger M. In the embodiments described here, the passenger M inputs the desired destination floor on the elevator operating device 6 by means of one or more call symbols 23. The call input results in a destination call which specifies the boarding floor, which is provided by the location of the elevator operating device 6, and the destination floor.

The elevator controller 13 is configured for processing such a destination call and makes an elevator car 10 available on the boarding floor for boarding; that is, if the elevator car 10 is not on the boarding floor, it is moved there and its elevator door is opened, otherwise the elevator door of the elevator car 10 that is already there is simply opened. In the elevator installation 1 having such a destination call controller, the passenger M in the elevator car 10 cannot usually enter a destination floor at a car device 4 arranged therein; the car device 4 serves only to display the destination floor, make an emergency call, and initiate or delay the closing of the door, for example. The car device 4 is connected to the elevator controller 13 by means of a communication line 20.

According to the embodiment shown in FIG. 1, the elevator controller 13 can comprise two subsystems, a control system 8 and a destination call control system 12. The control system 8 controls the movement of the elevator car 10, while the destination call control system 12 determines the elevator car 10 serving a destination call. For the purpose of illustration, however, FIG. 1 only shows an elevator car 10 or an elevator. A person skilled in the art would recognize that the elevator installation 1 can comprise more than one elevator car 10 or more than one elevator. The destination call control system 12 checks, for example, which elevator is available and/or which elevator is closest to the boarding floor in order to thus allocate the most "economical" elevator to the destination call. This procedure, in particular in connection with algorithms provided in a destination call controller, is known to a person skilled in the art, and therefore further explanations in this regard do not seem necessary. The control system 8 actuates the drive machine 14 such that, inter alia, the allocated elevator car 10, together with the passenger M, is moved from the boarding floor to the destination floor. A person skilled in the art would recognize that in an embodiment with multiple elevators, each elevator has a control system 8.

According to the embodiment shown in FIG. 1, an elevator operating device 6 is arranged on each floor L1, L2, each elevator operating device being communicatively connected to the elevator controller 13 via the communication network 22. In one embodiment, each elevator operating device 6 has a housing which, for example, is arranged either on, or completely or in part in, a building wall in the access area to a floor-side elevator door (elevator shaft door). In one embodiment, the elevator operating devices 6 are supplied with electrical energy via the communication network 22, for example by means of a technology known as Power over Ethernet (PoE).

Figure 2:
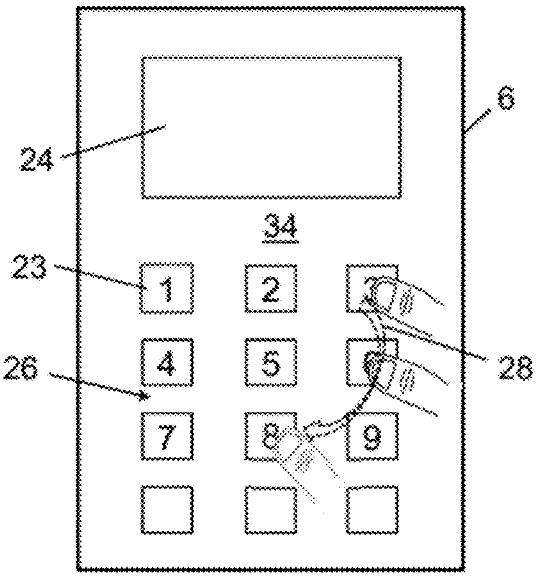
FIG. 2 is a schematic representation of an example of a user interface of an elevator operating device which is arranged in the elevator installation according to FIG. 1 on a floor.

FIG. 2 shows a schematic representation of an example of an elevator operating device 6 which is arranged in the elevator installation 1 according to FIG. 1 on a floor L1, L2. The elevator operating device 6 comprises a touch-sensitive screen system 26 comprising a touch-sensitive (sensor) screen (hereinafter also referred to as a touchscreen) which displays a user interface 34 visually to the passenger M. The user interface 34 is a graphic user interface (GUI) and allows communication between the passenger M and the elevator installation 1. The passenger M can, for example, select a displayed graphic symbol or control element by touching; for example, the passenger M can touch a displayed call symbol 23 or a plurality of call symbols 23 in order to input the desired destination floor. If the passenger M touches the desired call symbol 23, the elevator installation 1 or the elevator operating device 6 confirms this touch to the passenger M.

In the embodiment shown in FIG. 2, the user interface 34 displays an information field 24 and call symbols 23 arranged in the form of a 10-key keypad; some of the call symbols 23 are numbered from one to nine for illustration. The call symbols 23 are, for example, rectangular, but they can also have a different shape, e.g., round or oval. If, for example, the passenger M only touches the call symbol 23 with the number "3," a destination call, e.g., a request to travel from the boarding floor to the third floor, is initiated. The elevator controller 13 allocates an elevator car 10, which can then be displayed in the information field 24, to this destination call.

In taller buildings with a correspondingly large number of floors, it may be undesirable to represent each floor by a call symbol 23 because clarity would be impaired and a relatively large amount of space required. In order to avoid this, elevator operating devices can be configured in such a way that destination calls to higher floors (e.g., from floor "11") have to be input digit by digit. This is illustrated in FIG. 2 by a finger which is guided from the digit "3" along a path 28 via the digit "6" to the digit "8" in order to input a destination call to the 38th floor. As stated elsewhere in this description, in one embodiment, the passenger M presses the call symbols 23 with the digits "3" and "8" intentionally, but only glides over the call symbol 23 with the digit "6"; e.g., the user interface 34 is touched during this gliding action, but without consciously increased pressure. Although the displayed call symbols 23 cannot be moved perpendicularly to the surface like mechanical or electromechanical buttons, the term "press" is used here to express that this is an intentional action by the passenger.

The terms "digit" and "character" used in this description relate to the information stored for a call symbol 23. A character can be a digit, a figure, a number, a graphic character, a symbol, or a word. A call symbol 23 can include, for example, a mathematical minus symbol (−), which has to be touched if the destination floor is a sublevel or basement floor of building 2.

In one embodiment, the user interface 34 has a size, e.g., specified as width and length (or height) or as screen diagonal, which can depend on the (physical) size of the touchscreen. The screen diagonal can, for example, be between approximately 4 and approximately 24 inches. In another embodiment, the size of the user interface 34 can also depend on which area or which portion of the touchscreen is defined as a usable area (for touching and/or displaying information). A person skilled in the art would recognize that the size of the user interface 34 can be selected in accordance with the requirements specified for the building 2, for example the number of floors and/or the type or use of the building 2 (regular/irregular passengers who are familiar/not familiar with the building 2 and therefore need less/more information).

The call symbols 23 and the information field 24 on the user interface 34 can be positioned and dimensioned depending on the requirements in the building 2 on the user interface 34, e.g., it can be defined where and in what size they are displayed. The call symbols 23 can be configured graphically in a user-friendly manner; for example, the call symbols 23 can be displayed as buttons or push buttons in order to enable intuitive operation. If the passenger M deliberately presses one of these call symbols 23, this pressed button is identified by a light effect in one embodiment.

A person skilled in the art would recognize that additional information can be displayed in the information field 24, for example the direction of movement of the allocated elevator car 10, its arrival time, its occupancy (e.g., the number of passengers in the elevator car 10), and/or directional information for guidance to the elevator car 10. The information field 24 can also be used to display floor-specific and/or building-specific information. For example, it can be indicated in the information field 24 that practice or office space of a service provider (doctor, dentist, lawyer) is located on a particular floor. If necessary, it can be indicated in the information field 24 when planned elevator maintenance takes place or that a floor is currently inaccessible, for example. The information field 24 can indicate, for example, the floor L1, L2 on which the elevator operating device 6 is arranged. This makes it easier for a passenger M to orient themselves in the building 2, for example. A person skilled in the art would recognize that at least one further information field can be provided and displayed on the user interface 34.

In the situation shown in FIG. 1, the technology described herein can be used in an advantageous manner. Briefly and by way of example, the technology described herein provides an elevator installation 1 in which elevator operating devices 6 are arranged, each of which devices has a touch-sensitive screen system 68 (see FIG. 3) equipped with a substantially planar touch surface 35 and can still be operated easily and comfortably by passengers with impaired vision. If a passenger M touches a call symbol 23 to input an elevator call, the screen system 68 responds with haptically perceptible feedback. In addition, acoustically perceptible feedback can be generated. Although the call symbols 23 are not visible or are only poorly visible to a passenger M with impaired vision and also cannot be felt on the smooth touch surface 35, this passenger M is supported in inputting the call. The technology described here supports the call input in particular when the destination is a higher floor and the passenger M must touch two or more call symbols 23 one after the other in order to e.g., enter a first floor digit and then one or more floor digits. According to the technology described here, the passenger M can glide or slide a finger over the touch surface 35 for such a call input after entering the first floor digit, with each touched call symbol 23 generating haptically and acoustically perceptible feedback until the finger touches the call symbol 23 for the desired floor digit; then, according to one embodiment, the passenger M can increase the pressure in order to input this floor digit. An embodiment for this purpose is described in connection with FIGS. 4 and 5. Despite this functionality, passengers P without such a disability can operate the elevator operating devices 6 in the usual way.

Figure 3:
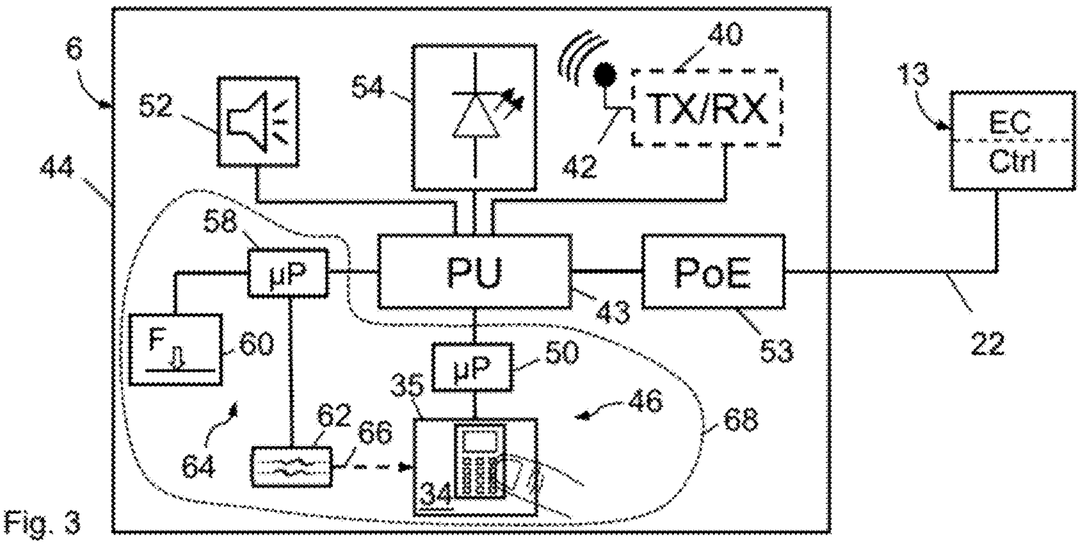
FIG. 3 is a schematic representation of the elevator operating device and examples of components of the elevator operating device.

FIG. 3 shows a schematic representation of an example of an elevator operating device 6 which is arranged in the elevator installation 1 according to FIG. 1 on a floor L1, L2. Components of the elevator operating device 6 are shown in FIG. 3; a person skilled in the art would recognize that the representation is by way of example and the components, including any additional components, can be communicatively connected to one another in a different manner, for example. The elevator operating device 6 is communicatively connected to the elevator controller 13 via the communication network 22. The elevator operating device 6 comprises a carrier apparatus 44 on which the components specified below can be arranged. In one embodiment, the carrier apparatus 44 is configured as a housing, as a result of which the elevator operating device 6 can be arranged on a building wall or so as to stand on the floor. A person skilled in the art would recognize that such a housing may not be necessary if the elevator operating device 6 is installed completely or in part in a building wall or in a door frame of a floor-side elevator door; in this case, the carrier apparatus can be an electrical printed circuit board, for example. A person skilled in the art would also recognize that the elevator operating devices 6 are arranged at a height that is user-friendly or prescribed by a standard. In the following description of the technology, the carrier apparatus 44 is configured as a housing and is referred to as "housing 44."

In the embodiment shown, the following are arranged on the housing 44 of the elevator operating device 6: the screen system 68 comprising a touchscreen 46; a communication device 53 (PoE); and an illumination device 54. In one embodiment, the touchscreen 46 has a transparent glass or plastics cover which closes the housing 44 externally or on the user side. The outer surface of the glass or plastics cover is the touch surface 35 which the passenger M touches, for example when inputting a call. A person skilled in the art would recognize that the glass or plastics cover can have a planar or curved glass or plastics plate; in the following, the plate is a glass plate. Regardless of the specific shape of the plate, its outer surface feels smooth to the passenger M, e.g., it has no elevations, depressions, roughening, or Braille markings, for example.

The components arranged on the housing 44 represent, inter alia, the user interface 34, the communication (including the energy supply), and the illumination. In one embodiment, an electroacoustic transducer 52 (e.g., a loudspeaker) is provided in order to generate acoustic feedback (voice message), e.g., when touching the touchscreen 46. The touchscreen 46 comprises a processor 50 and the user interface 34, on which the information field 24 and the keypad with the call symbols 23 are shown in FIG. 3.

The processor 50 is connected to a central control and processing device 43 (PU); it controls what is displayed on the user interface 34 and how it is displayed thereon; in addition, it detects a signal when a passenger M touches the touch surface 35 with a finger. The processor 50 also determines a time curve of the touch, including the time curve of the pressure with which the finger presses on the touch surface 35. A timer function implemented in processor 50 can be used for this purpose. The processor 50 can thus determine, for example, whether the finger remains on the touch surface 35 (e.g., a touch is still detected) or is removed (e.g., touch is no longer detected) after a recognized input (e.g., increased pressure on one of the call symbols 23 was detected).

The illumination device 54 is used to illuminate the user interface 34 of the elevator operating device 6, or only regions of the user interface 34. In a manner controlled by the central control and processing device 43, the illumination device 54 can light up the user interface 34 such that the displayed call symbols 23 and the displayed information field 24 can be perceived by a passenger M, in particular in poor lighting conditions. The illumination device 54 can also illuminate the user interface 34 or the call symbols 23 and the information field 24 with colored light in order to confirm the input of an elevator call to the passenger M, for example. In one embodiment, the illumination device 54 comprises one or more LED light sources.

In one embodiment of the elevator operating device 6, the touchscreen 46 is combined with a feedback device 64, resulting in the touch-sensitive screen system 68. For the purpose of illustration, the screen system 68 is bordered by dashed lines in FIG. 3; a person skilled in the art would recognize that this border is by way of example and more or fewer components can be understood to belong to the screen system 68. The mode of operation of the user interface 34 is modified by the feedback device 64, as a result of which supported operation by means of haptically perceptible feedback is made possible. If the user interface 34 or the touch surface 35 is touched at a location, haptically perceptible feedback is given in response to this touch. Depending on the design, the haptically perceptible feedback can be accompanied by a vibration noise and/or a voice message, for which the electroacoustic transducer 52 is provided. A haptic feedback module created from such a combination of a touchscreen and a user interface guided by touch can be obtained, for example, from the company next system Vertriebsgesellschaft, Vienna, Austria.

The feedback device 64 shown in FIG. 3 comprises a force measuring device 60 (e.g., in the form of a thin layer of capacitive pressure sensors), an actuator 62, and a control device 58 which is connected to the force measuring device 60 and the actuator 62. The force measuring device 60, in conjunction with the control device 58, measures the force with which the passenger M presses on the touch surface 35 or the user interface 34 of the touchscreen 46. The force measuring device 60 detects the smallest changes in a distance between the (slightly flexible) glass plate and the thin layer of capacitive pressure sensors or an underlying layer. In one embodiment, the control device 58 is configured such that it only registers the measured force as a triggering force if the measured force reaches a defined pressure threshold value; only then is the touch considered to be deliberate pressing or deliberate input.

In one embodiment, the actuator 62 comprises two electrode plates, a first electrode plate being configured as a conductive grid and being rigidly connected to the glass cover, and a second electrode plate being connected to the touchscreen 46 for common movement. A restoring element holds the electrode plates at a desired spacing. Such an arrangement can be referred to as an electrostatic parallel plate actuator. If the control device 58 actuates the actuator 62 by applying (e.g., after exceeding the triggering force) a voltage (the parameters of which, such as voltage, frequency, rising and falling edges, can be specified), the electrode plates move relative to one another counter to a force exerted by the restoring element; the glass cover moves accordingly, as a result of which the haptically perceptible feedback is generated. The effect of the actuator 62 on the touch surface 35 is indicated by an arrow 66 in FIG. 3.

Depending on the design of the elevator operating device 6, a reading device 40 for credentials of a passenger M can be arranged on the housing 44. The reading device 40 can be provided, for example, if the passenger M first has to identify themselves as authorized before the elevator operating device 6 can be enabled for the call input. The credentials can, for example, be in the form of a physical key, a manually input password (e.g., a PIN code), a biometric feature (e.g., fingerprint, iris pattern, speech/voice characteristics) or an access code captured from a magnetic card, chip card or RFID card or from an electronic device (NFC-, Bluetooth- or cellular network-based). The passenger M presents the credentials when they want to enter the desired destination floor. The reading device 40 is configured in accordance with the credentials provided in the elevator installation 1. This means that the reading device 40 comprises, for example, a key cylinder, a device for capturing a biometric feature, a device for capturing an optical code, a reader for a magnetic stripe card or a chip card, a keypad, or a touch-sensitive screen for manually inputting a password, or a transmitting and receiving device for radio signals.

In one embodiment, the credentials captured by the reading device 40 are forwarded to the elevator controller 13, which carries out or initiates the authorization check, for example by checking whether the authorization code captured is assigned to an authorized passenger in a database. The check can be carried out, for example, by an access control function of the elevator installation 1 or of an access control system. If the passenger M is authorized to access, the elevator operating device 6 can be enabled.

In the embodiment shown in FIG. 3, the reader 40 is a transmitting and receiving device for radio signals (TX/RX) and has an antenna 42. The reader 40 is also referred to below as a transmitting and receiving device 40 for radio signals (the transmitting and receiving device 40 is shown in dashed lines as an optional component). In order to make the call input possible, the transmitting and receiving device 40 can comprise an RFID reader or a radio module which communicates with a portable communication device (e.g., mobile radio/mobile phone, smartphone, tablet PC) of a passenger M. As an alternative or in addition to the transmitting and receiving device 40 for radio signals, a reader for an optical code presented by the passenger M (e.g., a barcode, QR code, or color code) can be provided; such a reading device can comprise a scanner or a digital camera.

The communication network 22 connects the elevator operating devices 6 to the elevator controller 13 and thus makes communication possible between the elevator controller 13 and the elevator operating devices 6. For this communication, the elevator operating devices 6 and the elevator controller 13 can be directly or indirectly connected to the communication network 22. The communication network 22 can comprise a communication bus system, individual data lines, or a combination thereof. Depending on the implementation of the communication network 22, individual addresses and/or identifiers can be allocated to the elevator controller 13 and each elevator operating device 6, such that, for example, the elevator controller 13 can send a message to a desired elevator operating device 6 in a targeted manner. Communication can take place in accordance with a protocol for wired communication, for example the Ethernet protocol. As mentioned, in one embodiment the elevator operating devices 6 are supplied with electrical energy via the communication network 22 (PoE).

In one embodiment, the central control and processing device 43 is configured to put the elevator operating device 6 into an inactive state in order to reduce its consumption of electrical energy. In this standby or energy-saving state, the control and processing device 43 switches off the illumination device 54, for example; the user interface 34 then appears in one embodiment as a dark (black) area. The switch-off can take place if no passenger has been at or in the vicinity of the elevator operating device 6 for a set time period. For this purpose, a sensor (not shown in FIG. 3) which detects the presence and/or a movement of a passenger can be provided in the elevator operating device 6. The sensor can be a motion sensor that operates according to one of known functional principles, e.g., actively using electromagnetic waves (RF, microwaves, or Doppler radar), using ultrasound (ultrasonic motion detector), or passively using infrared radiation (PIR sensor, pyroelectric infrared sensor) from the environment. If the elevator operating device 6 is in the energy-saving state and the motion sensor detects the presence of a passenger M, the central control and processing device 43 switches the elevator operating device 6 to an active state in which, for example, the user interface 34 shown in FIG. 2 is displayed.

In one embodiment, the car device 4 in the elevator car 10 displays the destination floor. In addition, the passenger M can make an emergency call at the car device 4 and accelerate or delay the closing of the door. For this purpose, the car device 4 can be configured according to one of several known technologies (for example electromechanical push buttons for the names functions or corresponding fields ("buttons") on a touchscreen). In one embodiment, the car device 4 is equipped with a touch-sensitive screen system and a feedback device in a manner analogous to the technology of the floor-side elevator operating devices 6. As stated above, the feedback device supports operation by means of haptically perceptible feedback.

The embodiment of the elevator operating device 6 shown in FIG. 3 comprises the processor 50, the control device 58, and the central control and processing device 43. In FIG. 3, these are shown as separate units. A person skilled in the art would recognize that, in another embodiment, their functionalities could be combined in one unit, for example in the central control and processing device 43; in FIG. 3, the processor 50 and the control device 58 could then be omitted.

Figure 4:
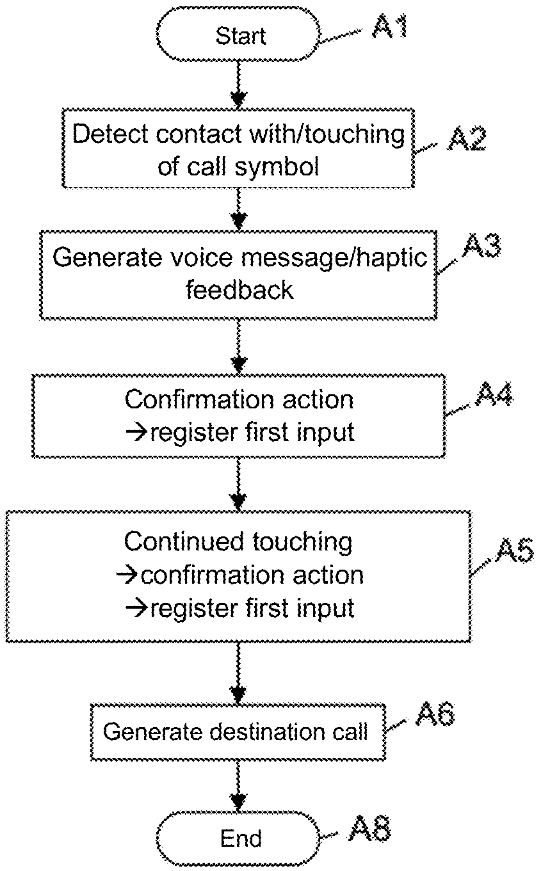
FIG. 4 is an example of a first embodiment of a method for operating an elevator operating device.
Figure 5:
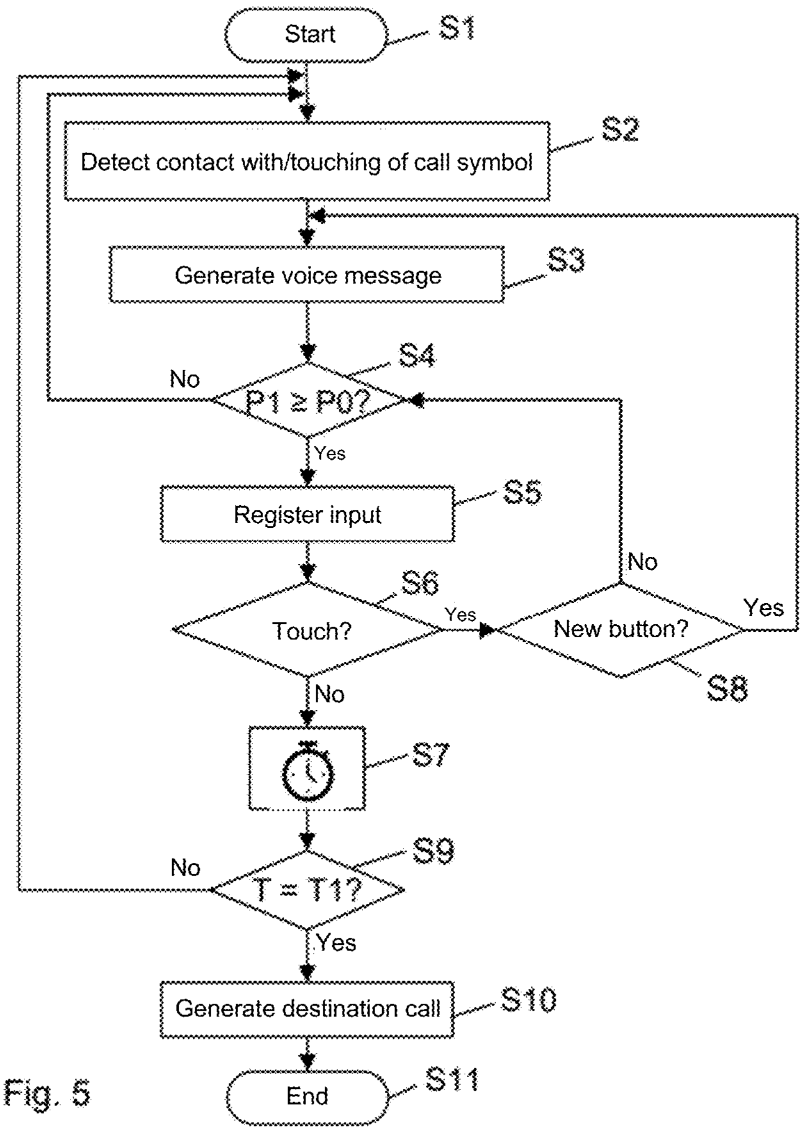
FIG. 5 is an example of a second embodiment of a method for operating an elevator operating device.

With the understanding of the above-described elevator installation 1 and its basic system components and functions, a description of an example of a method for operating the elevator operating device 6 as it is used in the elevator installation 1 shown in FIG. 1 is given below with reference to FIGS. 4 and 5. FIG. 4 shows a first example flowchart of a method, beginning with a step Al and ending with a step A8, and FIG. 5 shows second example flowchart of a method, beginning with a step Sl and ending with a step S11. A person skilled in the art would recognize that the division into these steps is by way of example and that one or more of these steps may be divided into one or more sub-steps or that a plurality of the steps may be combined into one step.

The flowcharts are described with reference to a passenger M who has impaired vision or is blind. It is assumed here that the passenger M is on a floor L1, L2 within reach of an elevator operating device 6 arranged there and would like to input a destination call (elevator call) at said device in order travel from this boarding floor (L1, L2) to a destination floor. In this embodiment, the elevator installation 1 is configured in such a way that the elevator operating device 6 is activated (e.g., it is not in the energy-saving state) and displays the user interface 34 illustrated in FIG. 2.

In FIG. 4, in a step A2, contact with the touch surface 35 of an elevator operating device 6 made by the passenger M when inputting a destination call is detected. The contact comprises the passenger M touching a first call symbol 23 displayed on the graphic user interface 34. The first call symbol 23 is assigned a first character.

In a step A3, a voice message indicating the first character and the haptically perceptible feedback are generated. The passenger M hears the voice message and thus knows where their finger is, e.g., whether their finger has already touched the desired call symbol 23 or whether they have to move the finger further.

In a step A4, the first character is registered as the first input that is assigned to the destination call input of the passenger M. The first character is registered in response to a confirmation action by the passenger M, during which the first call symbol 23 continues to be touched, e.g., the passenger M continuously touches the touch surface 35 and carries out the confirmation action in the process. Embodiments of such a confirmation action are given elsewhere in this description.

In a step A5, at least one further character is registered as a further input assigned to the destination call input of the passenger M. This may be necessary if a multi-digit floor is to be input as the destination floor. This registration of the further character also takes place in response to a further confirmation action by the passenger M, specifically while the touch surface 35 continues to be touched. The at least one further character can be stored for the first call symbol 23 or a further call symbol 23, e.g., the passenger M can enter the first character (first call symbol 23) a second time or enter a character different from the first character. In the latter case, the passenger M glides their finger from the first call symbol 23 to a new desired call symbol 23. The finger can glide over one or more undesired call symbols 23, for example along the path 28 shown in FIG. 2.

In a step A6, the destination call is generated upon interruption of the touch. An interruption occurs when the passenger P lifts their finger from the touch surface 35. The generated destination call indicates the destination floor Ll, L2 defined by the registered characters.

In the following, reference is again made to the exemplary method shown in FIG. 5. In a step S2, the method detects a contact with the touch surface 35 and touching of a call symbol 23 by the passenger M when inputting the destination call. Contact is made with the touch surface 35, for example, when the passenger M initially makes contact with the elevator operating device 6 and thus also the touch surface 35, for example in order to get a feel for the dimensions of the elevator operating device 6. A touch is detected when the touch occurs within the touch surface 35. Since the passenger M cannot see the elevator operating device 6 and the call symbols 23 displayed, they make contact with the touch surface 35 and in the process also touch one or more of the call symbols 23 displayed one after the other. As stated above, each call symbol 23 is assigned a character.

In a step S3, a voice message which is stored for the touched call symbol 23 is generated. The control device 50 of the touchscreen 46 identifies the location at which the touch occurs and to which call symbol 23 this point is assigned. The central control and processing device 43 then controls the electroacoustic transducer 52 to generate the voice message which indicates the character assigned to this location or button. At the same time, haptically perceptible feedback is generated by the actuator 62. If the finger first touches the button "3," as shown in FIG. 2, for example, the haptically perceptible feedback and the voice message "three" (or other similar wording for the digit) are generated.

If the passenger M touches the desired call symbol 23, it is checked whether the (first) character stored for the desired (first) call symbol 23 is to be registered as the (first) input. The first character is registered in response to a confirmation action by the passenger M, while the passenger M continues to touch the first call symbol 23. In one embodiment, the confirmation action can be carried out by the passenger M deliberately pressing harder on the displayed first call symbol 23. In another embodiment, the confirmation action can be carried out by the passenger M leaving their finger on the first call symbol 23 and, with another finger, tapping the touch surface 25 at a different location, for example several times, in particular twice, in quick succession.

In the following description of the method, the confirmation action is carried out by the passenger M deliberately pressing harder on the displayed first call symbol 23. In a step S4, it is therefore checked whether the first call symbol 23 is touched with a pressure P which is equal to or exceeds a defined pressure threshold value P1. If the finger is on the first call symbol 23, the passenger can deliberately press harder at this location and thus increase the pressure P. If the pressure threshold value P1 is reached or exceeded, the method proceeds along the "yes" branch to a step S5. If the passenger M does not increase the pressure P, e.g., the call symbol 23 currently being touched does not correspond to the desired character, no input is registered and the method returns along the "no" branch to step S2.

A person skilled in the art would recognize that, in step S2, an associated voice message is generated in accordance with step S3 each time a call symbol 23 is touched. The passenger M hears this voice message and can use this information to orient themselves on the user interface 34. For each call symbol 23 that is touched, a check is also made in accordance with step S4 to determine whether the associated character is to be registered as an input. Steps S2, S3, S4, and S5 show that the passenger M moves their finger on the user interface 34 until the finger is on the desired call symbol 23 and the passenger M hears the voice message for the associated character.

In step S5, the character is registered as an input. This input is assigned to the destination call input of the passenger M.

If the input is registered in step S5, the method checks, in a step S6, whether the passenger M continues to touch the touch surface 35 or lifts their finger. If the passenger M does not lift their finger and therefore continues to touch the touch surface 35, the passenger M may be a passenger with restricted vision who wants to input another character. The finger remains on the touch surface 35 so that the passenger M can orient themselves on the touch surface 35, starting from the first call symbol 23 that has already been touched, in order to input another character. It may be necessary to input another character, for example, if a destination call for higher (multi-digit) floors has to be entered digit by digit. If the finger remains on the touch surface 35, the method proceeds along the "yes" branch to a step S8.

In step S8, while the finger remains on the touch surface 35, it is checked whether the finger of the passenger M is on another call symbol 23, e.g., a new button. If this is the case, the method goes back along the "yes" branch to step S3 and a character stored for the (newly) touched call symbol 23 is announced. The subsequent steps S4, S5, and S6 are then run through as described above.

If the passenger M does not touch a new call symbol 23 in step S8, the method proceeds along the "no" branch back to step S4, and it is checked whether the contact is made with a pressure P which is equal to or exceeds the defined pressure threshold value P1. Such a situation arises, for example, when the passenger M has to enter a monodigit (also referred to as a repdigit in mathematics) for the desired destination floor. The subsequent steps S5 and S6 are then run through as described above.

If it is recognized in step S6 that the passenger M has lifted their finger, it may be a passenger who does not have impaired vision and can thus recognize the call symbols 23; this passenger M can also input a further character in order to enter the destination call to the desired (higher) destination floor. In the case of this passenger M, however, the further character must be input within a defined time period Tl. In this case, the method proceeds along the "no" branch to a step S7.

In step S7, after the input has been registered according to step S5 and the passenger M lifts their finger according to step S6 (e.g., the contact does not last), a timer is started. The timer can be implemented, for example, in the processor 50 or in the central control and processing device 43. The timer determines the time period T that elapses after the input has been registered.

In a step S9, it is checked whether the time period T determined by the timer is equal to the defined time Tl. If this is the case, the passenger M wishes to complete the call input and thus not touch any further call symbol 23. The method accordingly proceeds along the "yes" branch to a step S10, according to which the destination call is registered in the elevator installation 1. The method ends in step Sll with the destination call registration.

However, if the passenger M wishes to enter a further character, this has to be done within the defined time period T1. If this time period T1 has not yet been reached in step S9, the passenger M can touch a call symbol 23 again; in FIG. 5, this is indicated by the "no" branch from step S9 back to step S2. The subsequent steps S3-S8 are then run through as described above, until, after a registered input, no further contact takes place within the time period T1 and the method ends in step S11.

The invention claimed is:

1. A method for operating elevator operating devices in an elevator installation comprising an elevator car and an elevator controller, wherein the elevator operating devices are communicatively connected to the elevator controller and are arranged on floors for inputting a destination call, wherein at least one of the elevator operating devices has a touch-sensitive screen system which is equipped with a smooth touch surface and is configured to display a graphical user interface having a number of call symbols and to respond with haptically perceptible feedback when a passenger touches the touch surface, the method comprising:

detecting contact with the touch surface of the at least one elevator operating device made by the passenger when a destination call is input, wherein the contact comprises the passenger touching a first call symbol displayed on the graphical user interface, wherein the first call symbol is assigned a first character;

generating a voice message indicating the first character and the haptically perceptible feedback;

registering the first character as a first input assigned to the destination call input of the passenger, wherein the first character is registered in response to a confirmation action by the passenger during touching;

registering at least one further character as a further input assigned to the destination call input of the passenger, wherein the at least one further character is registered in response to a further confirmation action by the passenger during touching, wherein the at least one further character is stored for the first call symbol or a further call symbol; and generating the destination call when the touch is interrupted, wherein the destination call indicates a destination floor defined by the registered characters.

2. The method of claim 1, wherein detecting that the touch surface is being touched comprises measuring a pressure with which the passenger touches the touch surface.

3. The method of claim 2, wherein an increased pressure by the passenger on the touch surface is defined as the confirmation action, and wherein registration of the first character comprises detecting that a pressure threshold value defined for the pressure has been reached.

4. The method of claim 2, wherein repeated tapping on the touch surface within a defined time period is defined as the confirmation action, wherein the tapping is detected while the touch is detected, and wherein the tapping is detected at a location remote from a location of the touch.

5. The method of claim 3, wherein, immediately after the registration of the first character as the first input, the registration of at least one further character comprises detecting a drop in the pressure to a value which is greater than zero and less than the defined pressure threshold value, wherein the pressure drop indicates continued contact with the touch surface.

6. The method of claim 5, wherein the continued touching comprises touching of the first call symbol or of a further call symbol, wherein, when the further call symbol is touched, a voice message indicating the further character and the haptically perceptible feedback are generated, and wherein the further character for the touched further call symbol is stored.

7. The method of claim 6, wherein the registration of the further character comprises detecting that the pressure threshold value defined for the pressure has been reached, wherein the character stored for the touched first or further call symbol is registered as the input.

8. An elevator operating device for inputting a destination call in an elevator installation, the device comprising:

a communication device which is configured to communicate with an elevator controller of the elevator installation;

a central control and processing device which is communicatively connected to the communication device;

an audio device which is communicatively connected to the central control and processing device and is configured to generate a voice message;

a touch-sensitive screen system which is equipped with a smooth touch surface, communicatively connected to the central control and processing device, and configured to display a graphical user interface having a number of call symbols and to respond with haptically perceptible feedback when a passenger touches the touch surface, wherein:

the screen system is configured to:

detect contact with the touch surface made by the passenger when inputting a destination call, wherein the contact comprises the passenger touching a first call symbol displayed on the graphical user interface, wherein the first call symbol is assigned to a first character, and generate the haptically perceptible feedback;

the audio device is configured to generate a voice message indicating the first character of the touched first call symbol; and the central control and processing device is configured to:

register the first character as the first input assigned to the destination call input of the passenger, wherein the first character is registered in response to a confirmation action by the passenger during touching;

register at least one further character as the further input assigned to the destination call input of the passenger, wherein the at least one further character is registered in response to a further confirmation action by the passenger during touching, wherein the at least one further character is stored for the first call symbol or a further call symbol; and generate a destination call when the touch is interrupted, which destination call specifies a destination floor defined by the registered characters, and to send said call to the elevator controller in order to be registered there.

9. The device of claim 8, wherein the screen system comprises an actuator which, when actuated by a control voltage, causes a surface of the screen system to vibrate, wherein the vibration represents the haptically perceptible feedback, and wherein the screen system comprises a force measuring device and a control device, wherein the force measuring device is configured to measure a pressure with which the passenger touches the touch surface of the screen system, and wherein the control device is configured to register the measured pressure as the triggering pressure only when the measured pressure reaches a defined pressure threshold value.

10. The device of claim 9, wherein:

repeated tapping of the touch surface within a specified time period is defined as the confirmation action, wherein the tapping takes place while a touch is detected and at a location remote from a location of the touch, and the central control and processing device is configured to detect, in addition to the detected contact, pressure changes within the defined time period.

11. The device of claim 9, wherein an increased pressure by the passenger on the touch surface is defined as the confirmation action, and wherein the central control and processing device is configured to register the first character when it is detected that the defined pressure threshold value has been reached.

12. The device of claim 11, wherein the central control and processing device is configured, in the event that a drop in the pressure to a value which is greater than zero and less than the defined pressure threshold value is detected immediately after the registration of the first character as the first input, to detect continued contact with the touch surface.

13. The device of claim 12, wherein the continued touching comprises touching of the first call symbol or of a further call symbol, wherein touching the further call symbol prompts a voice message indicating the further character and the haptically perceptible feedback, and wherein the further character for the touched further call symbol is stored.

14. The device of claim 13, wherein the registration of the further character comprises detecting that the pressure threshold value defined for the pressure has been reached, wherein the character stored for the touched first or further call symbol is registered as the input.

15. An elevator installation comprising:

an elevator operating device for inputting a destination call in an elevator installation, the device comprising:

a communication device which is configured to communicate with an elevator controller of the elevator installation;

a central control and processing device which is communicatively connected to the communication device;

an audio device which is communicatively connected to the central control and processing device and is configured to generate a voice message;

a touch-sensitive screen system which is equipped with a smooth touch surface, communicatively connected to the central control and processing device, and configured to display a graphical user interface having a number of call symbols and to respond with haptically perceptible feedback when a passenger touches the touch surface, wherein:

the screen system is configured to:

detect contact with the touch surface made by the passenger when inputting a destination call, wherein the contact comprises the passenger touching a first call symbol displayed on the graphical user interface, wherein the first call symbol is assigned to a first character, and generate the haptically perceptible feedback;

the audio device is configured to generate a voice message indicating the first character of the touched first call symbol; and the central control and processing device is configured to:

register the first character as the first input assigned to the destination call input of the passenger, wherein the first character is registered in response to a confirmation action by the passenger during touching;

register at least one further character as the further input assigned to the destination call input of the passenger, wherein the at least one further character is registered in response to a further confirmation action by the passenger during touching, wherein the at least one further character is stored for the first call symbol or a further call symbol; and generate a destination call when the touch is interrupted, which destination call specifies a destination floor defined by the registered characters, and to send said call to the elevator controller in order to be registered there.

* * * * *